United States Patent
Maurer et al.

(10) Patent No.: US 10,656,017 B2
(45) Date of Patent: May 19, 2020

(54) ON-BOARD PROCESSING OF HYPERSPECTRAL DATA

(71) Applicant: Eagle Technology, LLC, Melbourne, FL (US)

(72) Inventors: Paul Maurer, Fort Wayne, IN (US); Anna J. Glumb, Fort Wayne, IN (US)

(73) Assignee: Eagle Technology, LLC, Melbourne, FL (US)

( * ) Notice: Subject to any disclaimer, the term of this patent is extended or adjusted under 35 U.S.C. 154(b) by 390 days.

(21) Appl. No.: 15/966,470

(22) Filed: Apr. 30, 2018

(65) Prior Publication Data

US 2019/0331528 A1    Oct. 31, 2019

(51) Int. Cl.
| | |
|---|---|
| *H04L 27/22* | (2006.01) |
| *H04L 27/06* | (2006.01) |
| *G01J 3/28* | (2006.01) |
| *G01J 3/453* | (2006.01) |
| *G06T 1/00* | (2006.01) |
| *G01B 9/02* | (2006.01) |

(52) U.S. Cl.
CPC ........ *G01J 3/2823* (2013.01); *G01B 9/02089* (2013.01); *G01J 3/4535* (2013.01); *G06T 1/0007* (2013.01); *G01J 2003/2826* (2013.01); *G06T 2207/10036* (2013.01)

(58) Field of Classification Search
CPC .................. G01J 3/2823; G01J 3/4535; G01J 2003/2826; G01B 9/02089; G06T 1/0007; G06T 2207/10036
See application file for complete search history.

(56) References Cited

U.S. PATENT DOCUMENTS

| | | | |
|---|---|---|---|
| 4,523,846 A | 6/1985 | Breckinridge et al. | |
| 5,777,736 A | 7/1998 | Horton | |
| 7,135,682 B1 | 11/2006 | Lucey | |
| 2011/0013729 A1* | 1/2011 | Yuba | .................. H04L 27/2613 375/329 |

OTHER PUBLICATIONS

Chen, Y., et al., "CrIS Full Resolution Processing and Validation System for JPSS," Proc. 19th Int. TOVS Study Conf. (ITSC), pp. 1-12 (2014).
Hammer, P.D., et al., "Imaging Interferometry for Terrestrial Remote Sensing: Digital Array Scanned Interferometer Instrument Developments," Proc. SPIE 2480, Imaging Spectrometry, pp. 153-164 (Jun. 1995).
Smith, W.H., and P.D. Hammer, "Digital Array Scanned Interferometer: Sensors and Results," Applied Optics, vol. 35 (16): 2902-2909 (Jun. 1996).
Newport (2018) Technical Note, Introduction to FTIR Spectroscopy, available at https://www.newport.com/n/introduction-to-ftir-spectroscopy.

* cited by examiner

*Primary Examiner* — Jamil Ahmed
(74) *Attorney, Agent, or Firm* — Edell, Shapiro & Finnan, LLC

(57) ABSTRACT

Methods and systems to extract a spectrum of a hyperspectral interferogram, with innovative treatment of off-axis spectral correction and other features, which may be efficiently performed on-board a satellite.

20 Claims, 6 Drawing Sheets

ON-BOARD PROCESSING OF HYPERSPECTRAL DATA

BACKGROUND

There is a high demand for Imaging Fourier Transform Spectrometer (IFTS) hyperspectral data. Hyperspectral IFTS data is useful in a variety of fields, including atmospheric sounding (temperature, moisture, ozone), climate (greenhouse gas measurements), agriculture, and others.

Hyperspectral imaging, like other spectral imaging, collects and processes information from across the electromagnetic spectrum. The goal of hyperspectral imaging is to obtain a spectrum for each pixel in an image, such as to find objects, identify materials, and/or detect processes.

There are two general branches of spectral imagers: push broom scanners and related whisk broom scanners, which read images over time; and snapshot hyperspectral imaging, which uses a staring array to generate an image in an instance.

The human eye sees color of visible light in mostly three bands (long wavelengths, perceived as red, medium wavelengths, perceived as green, and short wavelengths, perceived as blue). Whereas spectral imaging divides the spectrum into many more bands. This technique of dividing images into bands can be extended beyond the visible. In hyperspectral imaging, the recorded spectra have fine wavelength resolution and cover a wide range of wavelengths. Hyperspectral imaging measures contiguous spectral bands, as opposed to multispectral imaging which measures spaced spectral bands.

Hyperspectral sensors collect orders of magnitude more data than traditional multi-spectral instruments.

An advantage of hyperspectral imaging is that, because an entire spectrum is acquired at each point, an operator needs no prior knowledge of the sample, and post processing allows all available information from the dataset to be mined. Hyperspectral imaging can also take advantage of the spatial relationships among the different spectra in a neighborhood, allowing more elaborate spectral-spatial models for a more accurate segmentation and classification of the image.

Challenges of hyperspectral imaging include cost and complexity. Fast computers, sensitive detectors, and large data storage capacities are needed for analyzing hyperspectral data. Significant data storage capacity is necessary since hyperspectral cubes are large, multidimensional datasets. All of these factors greatly increase the cost of acquiring and processing hyperspectral data. Another challenge is finding ways to program hyperspectral satellites to sort through data on their own and transmit only the most important images, as both transmission and storage of that much data could prove difficult and costly. As a relatively new analytical technique, the full potential of hyperspectral imaging has not yet been realized.

DETAILED DESCRIPTION

Disclosed herein are techniques to extract a spectrum of a hyperspectral interferogram, with innovative treatment of off-axis spectral correction and other features, which may be performed on-board a satellite.

Figure 1:
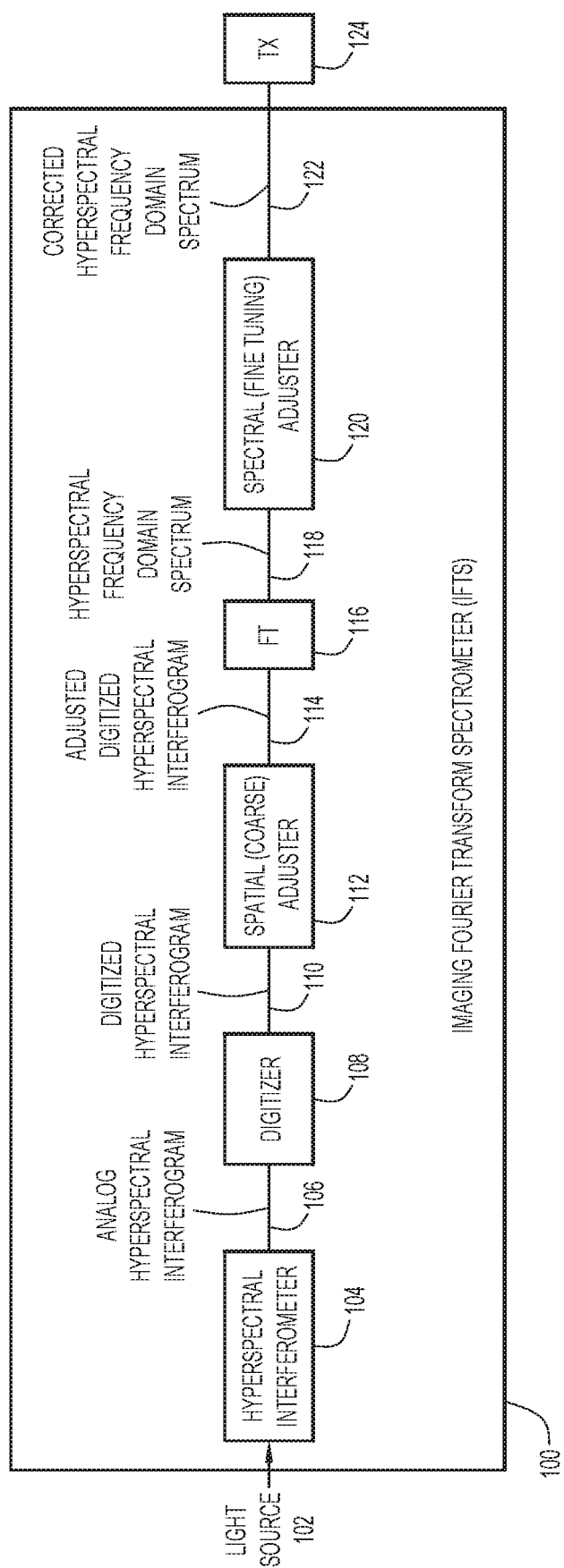
FIG. 1 is a block diagram of an imaging Fourier transform spectrometer (IFTS).

FIG. 1 is a block diagram of an imaging Fourier transform spectrometer (IFTS) 100, to determine a frequency domain spectrum of a source light 102 (e.g., an image of a portion of the Earth as viewed from a satellite).

IFTS 100 includes a hyperspectral interferometer 104 to provide an analog hyperspectral interferogram 106 of source light 102, such as described below with reference to FIGS. 2 and 3.

Figure 2:
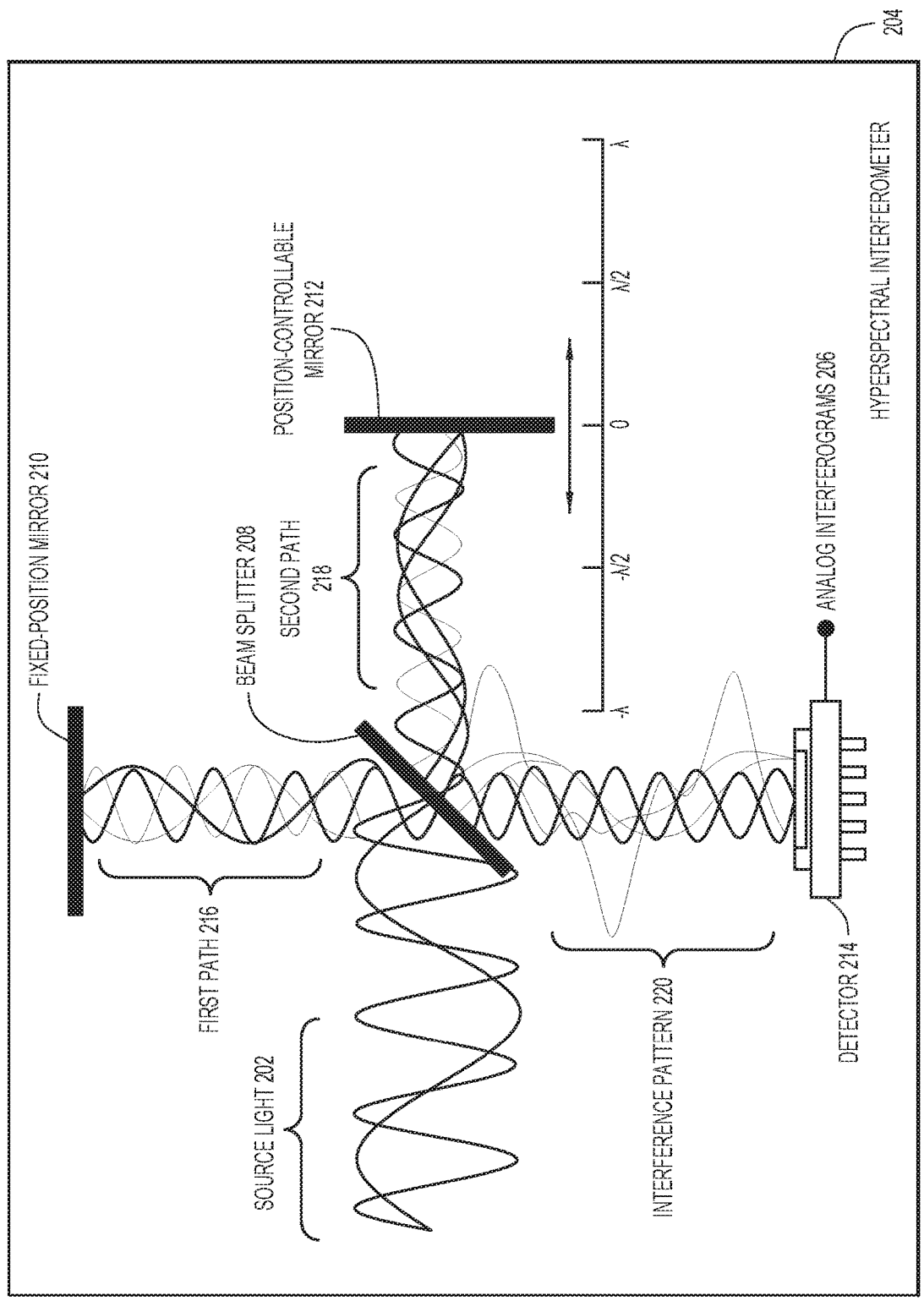
FIG. 2 is a diagram of a hyperspectral interferometer.

FIG. 2 is a diagram of a hyperspectral interferometer (interferometer) 204. Interferometer 204 includes a beam splitter 208 to split a source light 202 into first and second portions. The first portion is reflected from beam splitter 208 to a fixed-position mirror 210 along a first path 216. The second portion is transmitted through beam splitter 208 to a position-controllable mirror 212 along a second path 218. Mirrors 210 and 212 reflect the respective portions of light back to beam splitter 208, which re-directs the portions (or fractions thereof), as an interference pattern 220, to a detector 214.

Interferometer 204 may include one or more additional optical elements (e.g., a lens) between beam splitter 208 and one or more of source light 202, mirror 210, mirror 212, and detector 214. Mirror 116 and/or mirror 118 may include a flat mirror and/or a corner cube reflector.

Detector 214 is controllable to measure interference pattern 220 at many discrete positions of mirror 212, or at discrete intervals of time, to provide an analog interferogram 206.

Where source light 202 includes multiple wavelengths of light, interferogram 206 will be more complex than a single sinusoid, such as described below with reference to FIG. 3.

Figure 3:
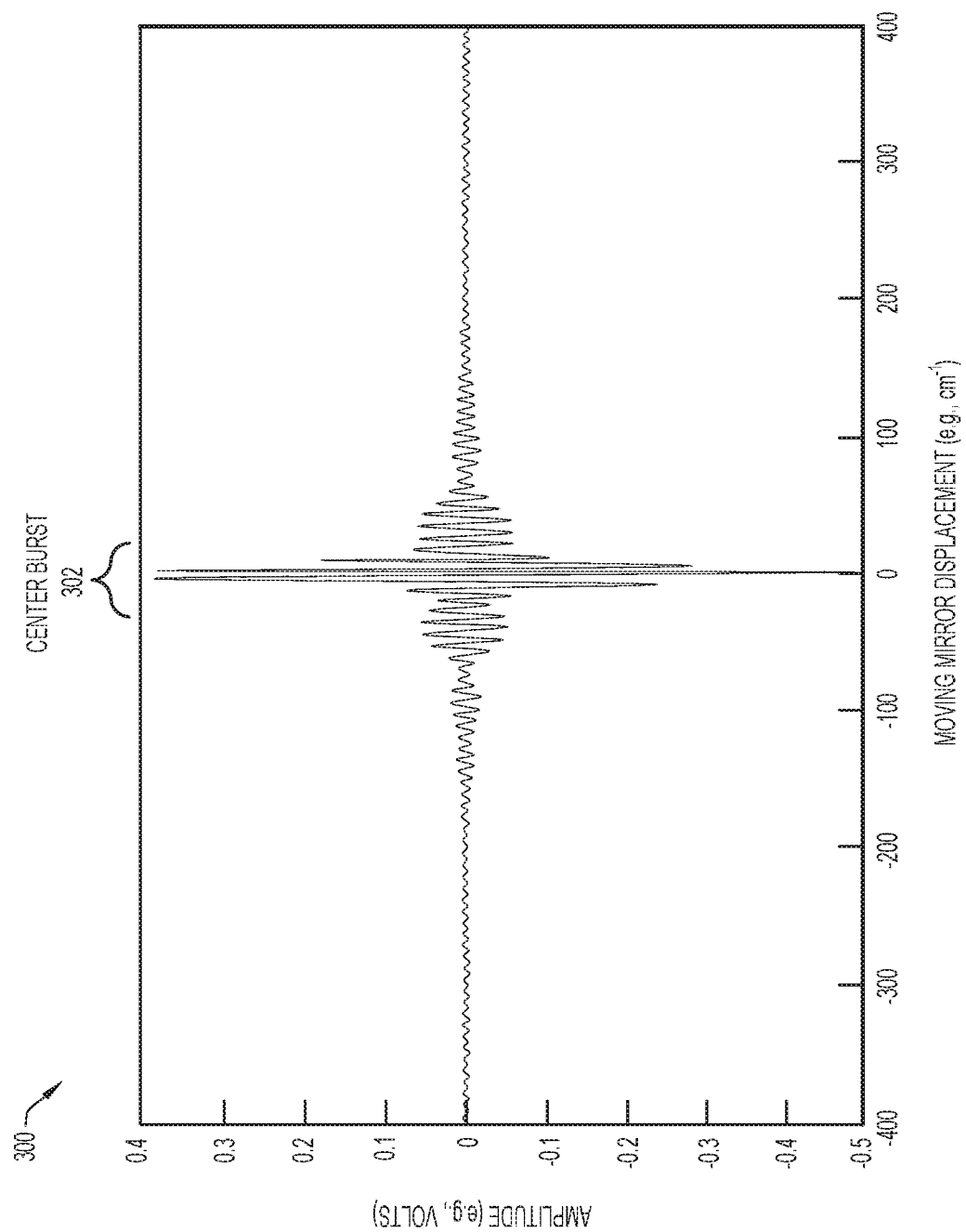
FIG. 3 is a depiction of an example interferogram.

FIG. 3 is a depiction of an example interferogram 300. The horizontal or X-axis of interferogram 300 represents an optical path difference (OPD).

OPD is a measure of an optical path difference between light beams travelling through two arms of an interferometer (e.g., first and second paths 216 and 218 in FIG. 2). In FIG. 2, OPD is a function of a product of the physical distance travelled by mirror 212, a multiplier that is a function of a number of reflecting elements, and an index of refraction of a medium of the interferometer arms (e.g., air, nitrogen for purged systems, vacuum, etc.).

In FIG. 2, interferometer 200 has a natural reference point when mirrors 210 and 212 are the same distance from beam splitter 208. This condition is called zero path difference (ZPD). The moving mirror displacement, $\Delta$, is measured from the ZPD. In FIG. 2, light reflected from moving mirror 212 travels $2\Delta$ further than light reflected from fixed-position mirror 210. The relationship between optical path difference, and mirror displacement, $\Delta$, is OPD=$2\Delta n$.

In FIG. 3, units of spectral measurement (OPD), are defined as a wavenumber ($cm^{-1}$). A wavenumber represents the number of full waves of a particular wavelength per centimeter (cm) of length of travel of a mirror of an interferometer (typically in vacuum; index of refraction n=1). An advantage of defining the spectrum in wavenumbers is that the wavenumber are directly related to energy levels. For example, a spectral feature at 4,000 cm$^{-1}$ spectral location represents a transition between two molecular levels separated by twice the energy of a transition with spectral signature at 2,000 cm$^{-1}$.

Interferogram 300 includes a spike or center burst 302 at 0 cm, which is a signature of a broadband source light. Center burst 302 indicates that all or substantially all wavelengths of a source light are in-phase at ZPD, such that contributions from each wavelength is at maximum. As the optical path difference, OPD, grows (i.e., as mirror 212 in FIG. 2 moves away from ZPD, towards λ or −λ), different wavelengths of the source light produce peak readings at different positions of the movable mirror (e.g., mirror 212 in FIG. 2). For a broadband source light, the different wavelengths reach their respective peaks at ZPD and, as the movable mirror moves away from ZPD, interferogram 300 becomes a relatively complex-looking oscillatory signal with decreasing amplitude.

Each individual spectral component of the source light contributes a sinusoid to interferogram 300, with a frequency that is inversely proportional to the wavelength of the respective spectral component.

In FIG. 1, IFTS 100 further includes a digitizer 108 (i.e., an analog-to-digital converter), to convert analog hyperspectral interferogram 106 to a digitized hyperspectral interferogram 110.

IFTS 100 further includes a spatial adjuster 112 to modify digitized hyperspectral interferogram 110 in a spatial domain, examples of which are described further below with reference to FIG. 4.

IFTS 100 further includes a Fourier transform module or engine 116 to convert adjusted digitized hyperspectral interferogram 114 to a frequency domain spectrum (spectrum) 118. Fourier transform engine 116 may be configured to perform a fast Fourier transform (FFT) on a power of 2 samples.

IFTS 100 further includes a spectral adjuster 120 to modify spectrum 118 in the frequency domain, examples of which are provided below with reference to FIG. 4.

A transmitter 124 may be provided to transmit corrected hyperspectral frequency domain spectrum (corrected spectrum) 122. IFTS 100 may, for example, be configured for an extraterrestrial application (e.g., on-board a satellite). In such an embodiment, transmitter 124 may be configured to compress and transmit corrected spectrum 122 to a ground based receiver.

A number of tasks are involved in computing a spectrum. For example, instrument imperfections and scan limitations may be accommodated with phase correction and apodization steps. These electronic and optical imperfections can cause erroneous readings due to different time or phase delays of various spectral components. Apodization is used to correct for spectral leakage, artificial creation of spectral features due to the truncation of the scan at its limits (a Fourier transform of sudden transition will have a very broad spectral content), angular divergence associated with a finite field of view, and other imperfections.

Conventionally, a multi-spectral (as opposed to hyperspectral), interferogram may be recorded and digitized on-board a satellite. To reduce complexity of the satellite, the digitized interferogram is transmitted to a ground station for further processing (e.g., Fourier Transform, non-linearity correction, radiometric calibration, and spectral correction). A hyperspectral interferogram contains significantly more data than a multi-spectral interferogram. It may thus be difficult or impractical to efficiently transmit a digitized hyperspectral interferogram from a satellite to a ground station.

As disclosed herein, one or more tasks may be performed in a spatial domain by spatial adjuster 112 (e.g., coarse adjustments, corrections, and/or compensation), which may simplify other tasks (e.g., non-linearity correction, radiometric calibration, and/or spectral correction). In this way, spectrum 118 may be computed by Fourier transform engine 116 and refined by spectral tuning adjuster 120, on-board a satellite, with relatively little or no added complexity to the satellite. The resultant corrected spectrum 122 may be compressed and efficiently transmitted to a ground station (e.g., over a limited-bandwidth channel).

Moreover, on-board conversion to spectra allows for use of a Principal Component Analysis (PCA) compression algorithm, which preserves the information content in the spectra. In other words, on-board conversion to spectra enables better compression and lower data rates.

IFTS 100 and/or portions thereof, may be implemented as described in one or more examples below. IFTS 100 is not, however, limited to the examples below.

Spatial adjuster 112 and/or spectral adjuster 120 may include one or more features described below with reference to FIG. 4. Neither spatial adjuster 112 nor spectral adjuster 120 is limited to the examples of FIG. 4.

Figure 4:
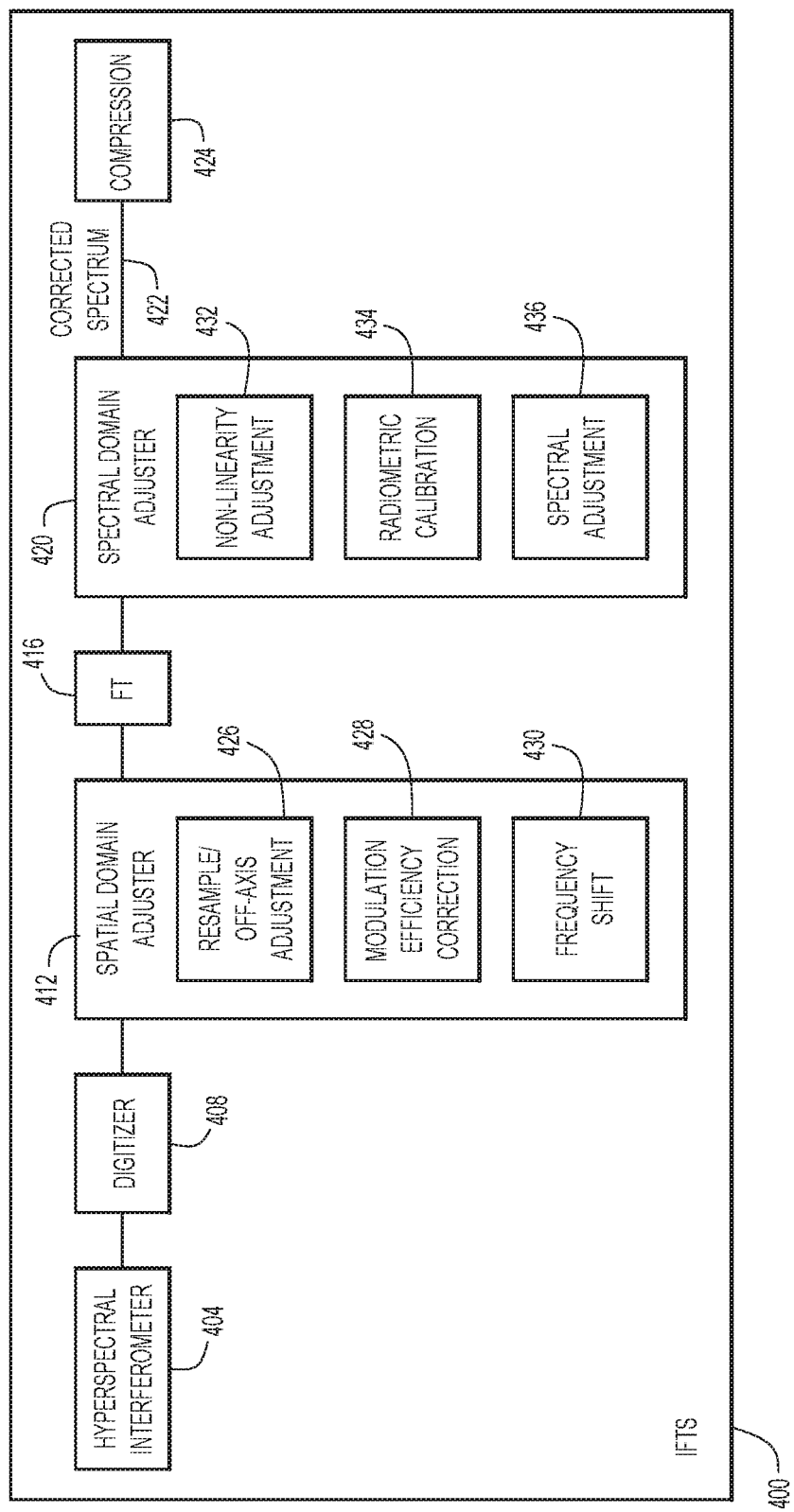
FIG. 4 is a block diagram of another IFTS.

FIG. 4 is a block diagram of an IFTS 400 to provide a corrected spectrum 422 of a hyperspectral interferogram. IFTS 400 includes a hyperspectral interferometer 404, a digitizer 408, a spatial adjuster 412, a Fourier transform engine 416, a spectral adjuster 420, and a compression engine 424.

Re-Sampling with Coarse Off-Axis Correction

In the discussion of OPD, further above, it is assumed that light travels straight through the center of each optical element of an interferometer. This is referred to as on-axis. Where light is on-axis, OPD is solely a function of mirror position (i.e., the position of mirror 212 in FIG. 2). This is referred to herein as a nominal OPD.

Light that is off-axis (e.g., off-angle by a certain degree), travels further than the nominal OPD. This further distance is referred to herein as actual OPD. Depending upon the field of view and the wavelength of light, the difference between nominal OPD and actual OPD may be a percentage of a stroke (i.e., a percentage of the distance traveled by mirror 212 in FIG. 2, from −λ to λ).

If a detector, such as detector 214 in FIG. 2, includes multiple detector elements or pixels, (i.e., a 1-dimensional or 2-dimensional array of pixels), actual OPD varies based on relative positions of the respective pixels.

In some situations, it is beneficial to re-sample an interferogram prior to Fourier transform. If an interferogram is re-sampled to a nominal (i.e., fixed), OPD, rather than the actual OPD(s), a Fourier transform of the re-sampled interferogram will produce a spectrum that is incorrectly shifted, which may necessitate relatively complex spectral correction.

If an interferogram is re-sampled to a rate(s) that matches or nearly matches the actual OPD(s) of the respective pixel(s), a Fourier transform will produce a spectrum with relatively little shift, which may be corrected with relatively minor/less complex spectral adjustments. Resampling may thus be used to provide a bulk or coarse off-axis correction.

In the example of FIG. 4, spatial adjuster 412 includes a re-sample/off-axis adjustment engine 426 to convert time-sampled data to fixed-OPD sampling. A detector array (e.g., detector 214 in FIG. 2), is best read at fixed time intervals, but Fourier transform spectroscopy (FTS) data must be processed as fixed optical path difference (OPD) data. Resample/off-axis adjustment engine 426 converts between the two.

Rather than resampling all pixels to the same OPD positions, each pixel is resampled to a rate that more closely matches its actual OPD given its mean off-axis angle. This may reduce the number of operations to be performed by spectral domain adjuster 420. Resampling with coarse off-axis correction may be performed with relatively minimal additional computations, and may reduce processing complexity of spectral domain adjuster 420.

Performing a coarse off-axis correction during resampling reduces the total number of computations to produce calibrated spectra. This enables leveraging of other existing technologies, such as principal component analysis compression. Resampling thus provides the spectra needed for principal component analysis as a downlink compression technique. This may permit transmission of a compressed version of corrected spectrum 422 at lower data rates, compared to conventional techniques, which may reduce costs in down link bandwidth, on-orbit buffers, and ground storage. This may also provide better accuracy at lower cost, smaller size, lower power, and lower data rate.

In an embodiment, angular offset of each pixel from the ideal on-axis location, is computed and used for coarse off-axis correction. In other words, each pixel may have a unique correction coefficient.

Coarse off-axis correction may compensate for most of the spectral correction needed for that pixel, but there may still be need for residual correction in spectral domain adjuster 420.

Angular offset parameters may be refined to fit data. This may include running an optimization scheme to determine slope and offset, and frequency offset needed to minimize wings of a matrix to look more like a diagonal or banded matrix and less like a full matrix with all its elements defined. It may generally follow a function of some constant in proportionality multiplied by the distance from the center of the pixel to the center of the optical system. This may provide a suitable number to use, or it may be optimized.

For example, the correction may be based on an angle at which light rays pass through the interferometer, which involves geometry of interferometer. Where additional lenses (e.g., external telescopes), are employed, the focal length may also affect the correction. In addition, the physical size of the detector array (i.e., the actual linear distance between the pixels, and to a certain extent the wavelength of the light being measured, may also be taken into account for the coarse correction.

Modulation Efficiency Correction

In FIG. 2, modulation efficiency may vary over a stroke of mirror 212. The variation in modulation efficiency may cause signal amplitude to vary with OPD position. Specifically, waveform amplitude may drop off as mirror 212 (FIG. 2), moves away from the center of the stroke, or away zero path difference (ZPD).

For some bands, the amplitude drop of may be a few percent, which may be relatively negligible. For other bands, amplitudes may drop off as much as 80%, which may be worth correcting in the spatial domain to "gain up" the wings. Although such correction may be performed after Fourier transform, performing the correction in the spatial domain (i.e., prior to Fourier transform), may reduce complexity and/or resource usage of spectral domain adjuster 420.

In the example of FIG. 4, spatial domain adjuster 412 further includes a modulation efficiency correction engine 428 to compensate for changes in modulation efficiency. Modulation efficiency correction engine 428 may be configured to perform a coarse modulation efficiency correction. The correction may include multiplying by an OPD dependent polynomial. Correcting for modulation efficiency in the spatial domain may further reduce the number of operations to be performed by spectral domain adjuster 420.

Frequency Shift

Resampling with coarse off-axis adjustment essentially uses a scaling factor to map a linear position to the spectral domain. In other words, coarse off-axis correction provides a scale factor scale an amplitude of a pixel that so that it maps correctly to an appropriate interval for the Fourier transform to convert it to the spectral domain.

In the example of FIG. 4, spatial domain adjuster 412 further includes a frequency shift module or engine 430 to apply a fixed frequency shift. This may include multiplying each sample by a complex exponential in the time domain to produce a fixed offset in the frequency domain. So, instead of having a line that has to pass through zero for correction, the line can be made to pass through an intercept with that frequency shift.

Applying a fixed offset may improve the quality of the coarse off-axis correction, which may further reduce the number and/or complexity of operations performed by spectral domain adjuster 420. Frequency shift engine 430 may utilize quadrature output from resample/off-axis adjustment engine 426.

The fixed frequency offset may serve as a second scale factor (i.e., in addition to the scale factor of off-axis adjustment).

Spectral Domain Corrections/Compensation

Spectral nonlinearity correction improves the accuracy of the spectrum.

Radiometric calibration applies recent measurements of calibration targets to correct for gain and offset drift.

Spectral correction provides correction for instrument line shape, modulation efficiency and laser wavelength.

In conventional satellite-based systems, non-linearity adjustment, radiometric calibration, and spectral adjustment are computationally intensive and are thus performed on the ground. For example, where each detector provides an 866 point spectra, spectral correction would be an 866×866 matrix, and the matrix multiply would be an $866^2$ operation.

By performing coarse off-axis correction in the spatial domain, subsequent (residual) spectral adjustment may be reduced to a banded matrix that requires significantly fewer operations (e.g., 866×39 operations). Non-linearity adjustment, radiometric calibration, and spectral adjustment may thus be efficiently performed on-board a satellite.

For additional efficiency, coefficients may be stored (e.g., in a ferro-type structure), on-board. In the example above, there is nominally a different set of 39 coefficients for each of the 866 items in the spectral correction table, but they actually vary relatively slowly from one of the 866 wavelength bins to the next, so fitting a parabola to that and just storing coefficients for each of the 39 entries may provide a suitable fit.

In the example of FIG. 4, spectral domain adjuster thus includes a non-linearity adjustment engine 432, a radiometric calibration engine 434, and a spectral adjustment engine 436.

Compression and Transmission

An 800+ point spectra can be represented by as few 30 principal components. Compression engine 424 may thus be configured to compress corrected spectrum 422 based on principal component analysis.

One or more features disclosed herein may be implemented in, without limitation, circuitry, a machine, a computer system, a processor and memory, a computer program encoded within a computer-readable medium, and/or combinations thereof. Circuitry may include discrete and/or integrated circuitry, application specific integrated circuitry (ASIC), a system-on-a-chip (SOC), field-programmable gate arrays (FPGAs), and combinations thereof.

Figure 5:
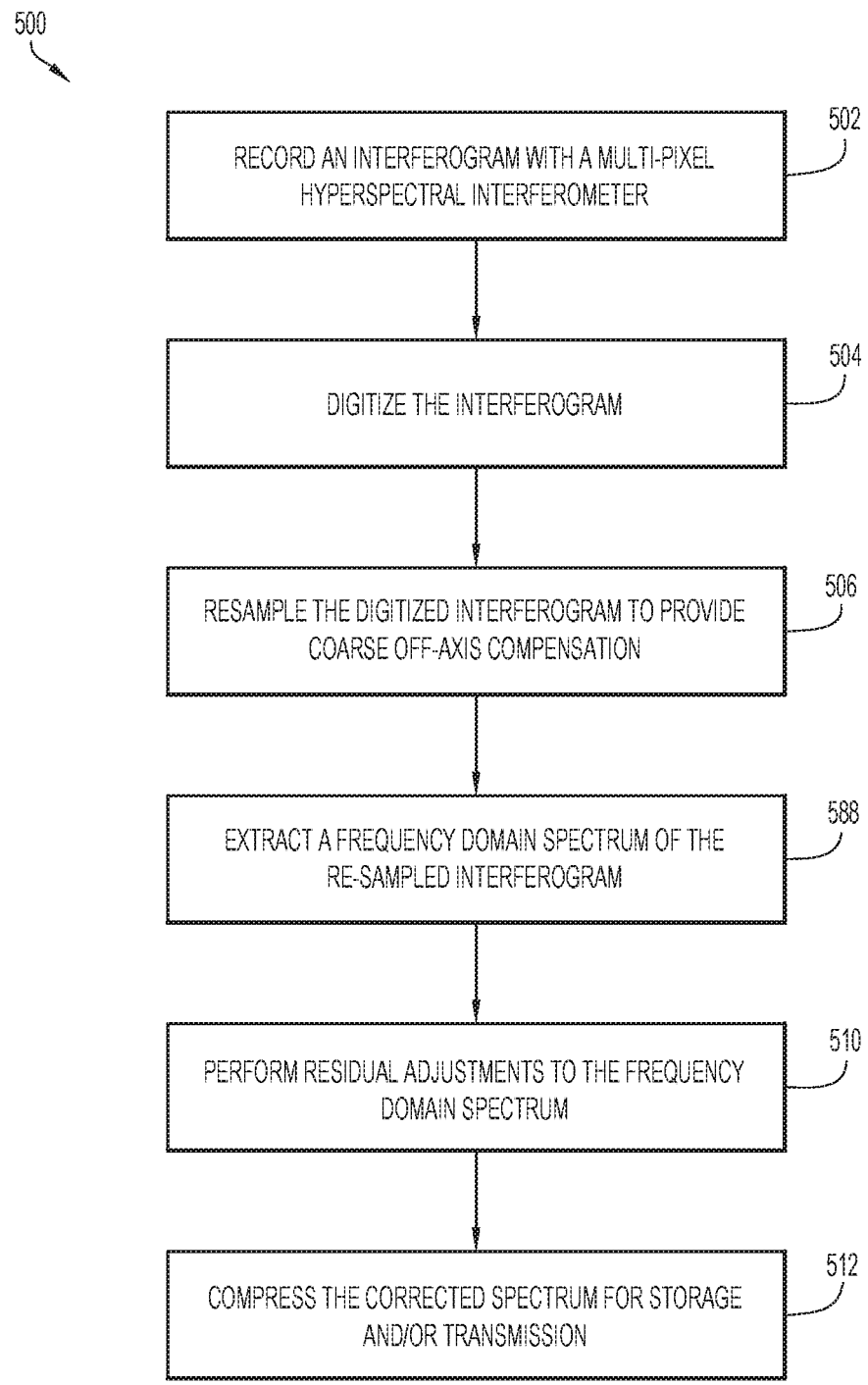
FIG. 5 is a flowchart of a method of generating a spectrum of a hyperspectral interferogram.

FIG. 5 is a flowchart of a method 500 of generating a spectrum of a hyperspectral interferogram.

At 502, an interferogram is recorded with a multi-pixel hyperspectral interferometer, such as described above with reference to FIGS. 2 and 3.

At 504, the interferogram is digitized.

At 506, the digitized interferogram is resampled to provide coarse off-axis compensations, such as described in one or more examples above. The resampled interferogram may be further compensated for modulation efficiency and/or frequency shift, such as described in one or more examples above.

At 508, a frequency domain spectrum of the resampled interferogram is extracted by Fourier transform.

At 510, residual adjustments are performed to the frequency domain spectrum, such as described in one or more examples above. This may include non-linearity adjustment, radiometric calibration, and/or spectral adjustment, such as described in one or more examples above.

At 512, the adjusted or corrected spectrum is compressed for storage and/or transmission, such as described in one or more examples above.

Figure 6:
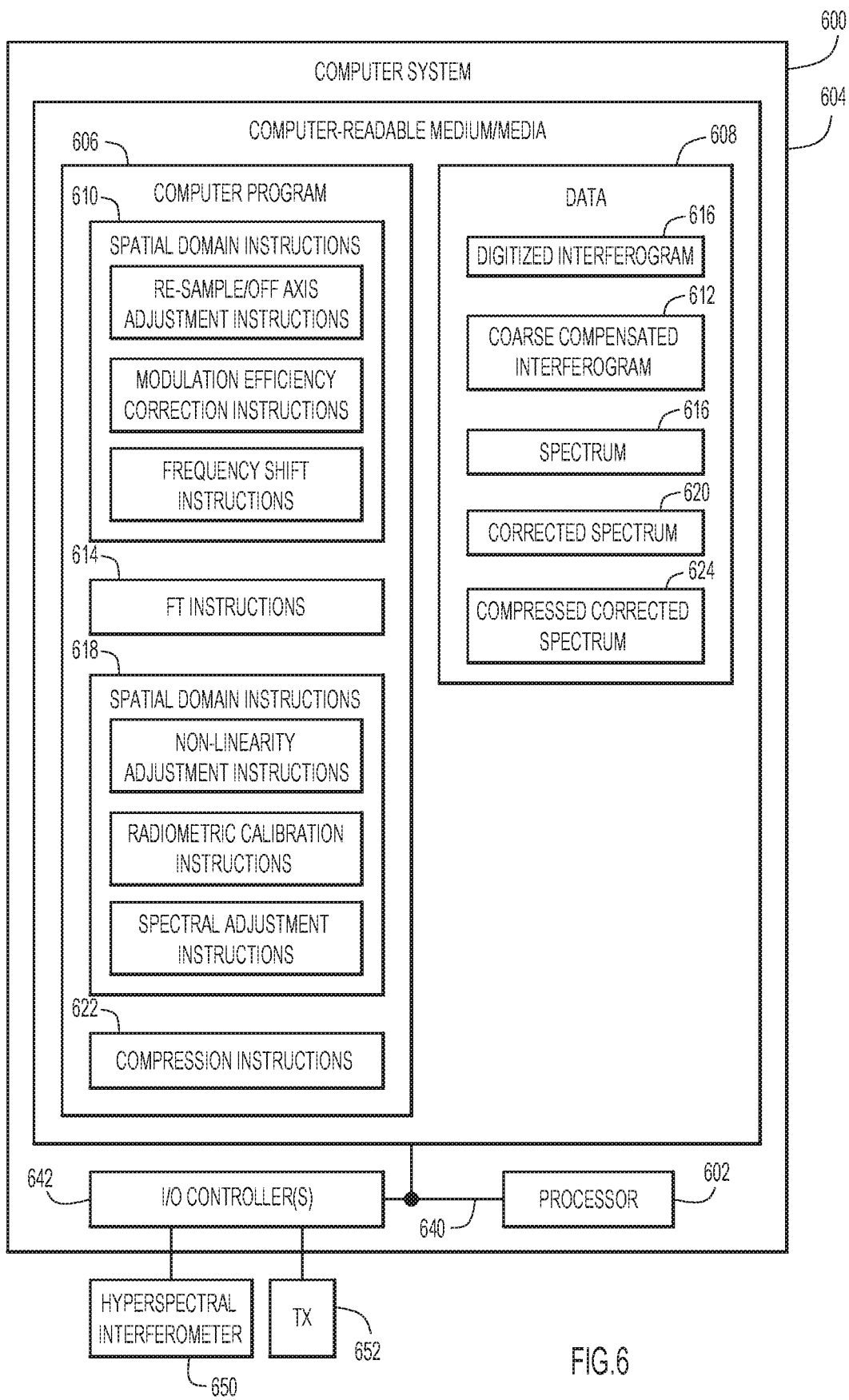
FIG. 6 is a block diagram of a computer system, configured to generate a spectrum of a hyperspectral interferogram.

FIG. 6 is a block diagram of a computer system 600, configured to generate a spectrum of a hyperspectral interferogram.

Computer system 600 includes one or more processors, illustrated here as a processor 602, to execute instructions of a computer program 606 encoded within a computer-readable medium 604. Medium 604 may include a transitory or non-transitory computer-readable medium.

Processor 602 may include one or more instruction processors and/or processor cores, and a control unit to interface between the instruction processor(s)/core(s) and computer readable medium 604. Processor 602 may include, without limitation, a microprocessor, a graphics processor, a physics processor, a digital signal processor, a network processor, a front-end communications processor, a co-processor, a management engine (ME), a controller or microcontroller, a central processing unit (CPU), a general purpose instruction processor, and/or an application-specific processor.

Computer-readable medium 604 further includes data 608, which may be used by processor 602 during execution of computer program 606, and/or generated by processor 602 during execution of computer program 606.

In the example of FIG. 6, computer program 606 includes spatial domain instructions 610 to cause processor 602 to process a digitized interferogram 616, captured by a hyperspectral interferometer 650, to provide a coarse compensated interferogram 610, such as described in one or more examples above.

Computer program 606 further includes Fourier transform instructions 614 to cause processor 602 to extract a spectrum 616 from coarse compensated interferogram 612.

Computer program 606 further includes spectral domain instructions 618 to cause processor 602 to refine spectrum 616 to provide a corrected spectrum 620, such as described in one or more examples above.

Computer program 606 further includes compression instructions 622 to cause processor 602 to compress corrected spectrum 620, such as described in one or more examples above.

Computer system 600 further includes communications infrastructure 640 to communicate amongst devices and/or resources of computer system 600.

Computer system 600 further includes one or more input/output (I/O) devices and/or controllers 642 to interface with one or more other devices, illustrated here as including hyperspectral interferometer 650, and a transmitter 652.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

What is claimed is:

1. A method, comprising:
   re-sampling a digitized interferogram captured by a multi-pixel hyperspectral interferometer, at rates that are based on positions of the pixels relative to a center path of the interferometer to provide a coarse off-axis correction;
   extracting a frequency domain spectrum of the re-sampled interferogram;
   performing residual adjustments to the frequency domain spectrum to provide a corrected spectrum; and
   compressing the corrected spectrum for storage and/or transmission.

2. The method of claim 1, performed on-board a satellite.

3. The method of claim 1, further including:
   performing a coarse modulation efficiency correction on the re-sampled interferogram, in the spatial domain, to compensate for changes in modulation efficiency related to movement of a mirror of the hyperspectral interferometer.

4. The method of claim 1, further including:
   multiplying samples of the resampled interferogram by a complex exponential, in the spatial domain, to provide course frequency shift to the frequency domain spectrum.

5. The method of claim 1, wherein the performing residual adjustments to the frequency domain spectrum includes:
   multiplying bins of the spectrum by a banded matrix.

6. The method of claim 5, wherein the performing residual adjustments to the frequency domain spectrum further includes:
   determining a set of coefficients for each bin of the spectrum;
   fitting a parabola to the sets of coefficients; and
   storing points of the parabola as the banded matrix.

7. The method of claim 1, wherein the compressing includes:
   representing the corrected spectrum with principal components of the corrected spectrum based on a principal component analysis.

8. An apparatus, comprising circuitry configured to:
   re-sample an interferogram captured by a multi-pixel hyperspectral interferometer, at rates that are based on positions of the pixels relative to a center path of the of the interferometer to provide a coarse off-axis correction;

extract a frequency domain spectrum of the re-sampled interferogram;

perform residual adjustments to the frequency domain spectrum to provide a corrected spectrum; and compress the corrected spectrum for storage and/or transmission.

9. The apparatus of claim 8, wherein the circuitry is on-board a satellite.

10. The apparatus of claim 8, wherein the circuitry is further configured to:

perform a coarse modulation efficiency correction on the re-sampled interferogram, in the spatial domain, to compensate for changes in modulation efficiency related to movement of a mirror of the hyperspectral interferometer.

11. The apparatus of claim 8, wherein the circuitry is further configured to:

multiply samples of the resampled interferogram by a complex exponential, in the spatial domain, to provide course frequency shift to the frequency domain spectrum.

12. The apparatus of claim 8, wherein the circuitry is further configured multiply bins of the spectrum by a banded matrix.

13. The apparatus of claim 12, wherein the circuitry is further configured to:

determine a set of coefficients for each bin of the spectrum;

fit a parabola to the sets of coefficients; and store points of the parabola as the banded matrix.

14. The apparatus of claim 8, wherein the circuitry is further configured to:

represent the corrected spectrum with principal components of the corrected spectrum based on a principal component analysis.

15. A non-transitory computer readable medium encoded with a computer program, including instructions to cause a processor to:

resample an interferogram captured by a multi-pixel hyperspectral interferometer, at rates that are based on positions of the pixels relative to a center path of the of the interferometer to provide a coarse off-axis correction;

extract a frequency domain spectrum of the re-sampled interferogram;

perform residual adjustments to the frequency domain spectrum to provide a corrected spectrum; and compress the corrected spectrum for storage and/or transmission.

16. The non-transitory computer readable medium of claim 15, further including instructions to cause the processor to:

perform a coarse modulation efficiency correction on the re-sampled interferogram, in the spatial domain, to compensate for changes in modulation efficiency related to movement of a mirror of the hyperspectral interferometer.

17. The non-transitory computer readable medium of claim 15, further including instructions to cause the processor to:

multiply samples of the resampled interferogram by a complex exponential, in the spatial domain, to provide course frequency shift to the frequency domain spectrum.

18. The non-transitory computer readable medium of claim 15, further including instructions to cause the processor to:

multiply bins of the spectrum by a banded matrix.

19. The non-transitory computer readable medium of claim 18, further including instructions to cause the processor to:

determine a set of coefficients for each bin of the spectrum;

fit a parabola to the sets of coefficients; and store points of the parabola as the banded matrix.

20. The non-transitory computer readable medium of claim 15, further including instructions to cause the processor to:

represent the corrected spectrum with principal components of the corrected spectrum based on a principal component analysis.

* * * * *